Patented Dec. 1, 1942

2,303,432

UNITED STATES PATENT OFFICE 2,303,432

SHORTENING

Kenneth R. Brown, Tamaqua, Pa., assignor to Atlas Powder Company, Wilmington, Del., a corporation of Delaware No Drawing. Application October 20, 1939, Serial No. 300,359

11 Claims. (Cl. 99—123)

The present invention relates to improvements in shortenings.

An object of the invention is to provide a shortening which is useful as a high ratio shortening in baking and also useful as a frying fat.

Another object is to provide a hydrogenated cottonseed oil shortening modified by the addition of a novel emulsifier comprising a partial fatty acid ester of an inner ether derivable from mannitol.

A further object is to improve hydrogenated cottonseed oil shortening by the addition of a product produced by reacting mannitol with hydrogenated cottonseed oil.

The above and other objects will be apparent from the specific description set forth hereinafter.

Shortenings, particularly those designed for household use, are used for two classes of purposes, namely, baking and frying. In baking they serve as shortenings, properly so-called, while in frying they are used as cooking fats. Unmodified hydrogenated cottonseed oil is largely used as an all-purpose shortening at the present time. It has been recognized however that this unmodified product does not permit the making of sweet baked goods, such as cakes, in which the sugar is present in larger quantities than the flour and in which relatively great quantities of liquids, as water or milk, can be used. Particularly in recent years the advantages of these so-called "high ratio" cakes have been recognized. A cake having more sugar than flour is sweeter, has better keeping qualities, remains fresh and keeps its flavor longer, and has a more uniform texture than one having a ratio of sugar to flour of 1 to 1 (called 100 ratio) or less. However, a ratio of much more than 100 cannot be used where a plain shortening is employed since a cake so made is subject to loss of volume through falling and shrinkage and has also a tendency to become dense and heavy as distinguished from the large volume, light texture cake which is desired.

For household use there is a further great advantage to a "high ratio" shortening for baking purposes. Cake baking in the home is a difficult branch of the cooking art and with ordinary shortenings many seemingly inexplicable baking failures are attributable to slight variations in ingredient proportions or baking conditions, particularly temperature, or both. With a "high ratio" shortening considerable latitude is offered in these conditions and there are notably fewer failures in baking. Thus, these improved shortenings are very valuable in cakes of ordinary sugar to flour ratios because they tend to make baking "foolproof."

In order to improve shortenings for the purpose of making high ratio bakings possible and to reduce baking failures as described it has been proposed to add various emulsifiers to shortenings. Shortenings containing such emulsifiers are satisfactory for baking. Many of these emulsifiers previously employed are relatively ineffective except in relatively high concentrations thus increasing the cost of the improved shortening objectionably. A further defect of the improved shortenings of the prior art refers to their low smoke points as will be discussed more fully below.

The smoke point of a shortening becomes highly important when it is used, as household shortenings invariably are, in high temperature operations such as frying and particularly deep fat frying as used, for example, in cooking doughnuts, French fried potatoes and the like. Shortenings which have smoke points below the cooking temperature are practically useless from the standpoint of the housewife since they emit volumes of smoke which soil the walls and ceiling of the kitchen and everything they contact. It is customary for a household to have only one type of cooking fat which must be used both for baking and for frying. As mentioned, the plain hydrogenated oil shortenings are useful for both types of operations but heretofore there has been no high ratio shortening which was capable of use for all purposes. For this reason high ratio shortenings have not been marketed extensively to the household trade.

The present invention produces a shortening which can be used in baking high ratio cakes and which can also be used for frying without the objection of excessive smoking. All the advantages incident to high ratios in cake baking are obtained when it is used. The cakes have excellent volume, texture and flavor and are not subject to the falling and shrinkage experienced with unmodified shortenings. The shortening is also useful, of course, for use in other types of baked goods such as biscuits, pies, waffles, bread and the like although with these other goods it may not be desired to use more sugar than flour or, in some of them, any sugar at all. The same shortening product can be used as a frying fat for both pan and deep fat frying. It is obviously highly advantageous to have one material to do both types of work.

According to the present invention it has been discovered that an all purpose high ratio shortening can be prepared by adding to a hydrogenated cottonseed oil a few percent of a novel improving agent. The improver of the invention comprises one or more of the partial esters of an inner ether derivable from mannitol and a fatty acid derivable from hydrogenated cottonseed oil, which ester or mixture of esters has a hydroxyl number of from 180 to 240. Mannitan mono-stearate, mannitan mono-oleate, mannitan mono-palmitate or mixtures thereof can be used. Such a partial ester can be produced for example, by reacting mannitol and the acid, in proper proportions to give a mono-ester, in the presence of an alkaline catalyst and at about 482° F. so that the mannitol loses water and forms inner ethers, largely mannitan, which then react with the fatty acid. Useful mixed esters can be made by using a mixture of fatty acids, such as are obtainable by hydrolysis of hydrogenated cottonseed oil, in the esterification reaction. In each case however the hydroxyl number of the improver must be between 180 and 240 to operate efficiently in an all purpose shortening.

While the above described esters or ester mixtures are the agents responsible for the improvement in my shortening, I prefer to make the improver by the reaction of mannitol and hydrogenated cottonseed oil in which alcoholysis occurs releasing some of the fatty acids which combine with the inner ethers formed by dehydration of mannitol under the conditions of the reaction. This reaction is produced by heating 1.25 to 2.50 mols mannitol to each mol of hydrogenated cottonseed oil, in the presence of an alkaline catalyst, at about 392 to 572° F. and preferably at 392 to 420° F. until the reaction is completed. After purifying to remove the catalyst and any unreacted ingredients, deodorizing and, if desired, decolorizing, the product has a hydroxyl number in the given range. The reaction product contains predominantly the partial esters of the fatty acids derivable from hydrogenated cottonseed oil and the inner ethers derivable from mannitol, principally mannitan. A product so prepared is preferable to a pure ester or mixture of pure esters for several reasons. The principal reason is that the product of the alcoholysis reaction has a taste and odor more like hydrogenated cottonseed oil, so that its presence in a shortening and ultimately in foods does not modify the normal taste thereof. The alcoholysis reaction is also comparatively simple and economical to perform.

It is to be understood that the improver for use in this invention can be prepared otherwise than as just described. Numerous other ways of forming such esters will be apparent to persons skilled in this art.

It has been found that in order to make a satisfactory all-purpose shortening that is, one that is free from turbidity and has a smoke point of 350° F. or higher, the hydroxyl number of the purified ester should be between 180 and 240 and preferably between 195 and 220.

By the term "hydroxyl number" I mean the number of milligrams of potassium hydroxide equivalent to the hydroxyl content of one gram of fat, oil or wax as determined in accordance with the method of Roberts and Schuette, Industrial and Engineering Chemistry, Analytical Edition, vol. 4, 1932, page 257.

If the hydroxyl number of the ester is below 180 it does not function as an efficient emulsifier in a high ratio shortening for baking purposes. If the hydroxyl number is above 240 the high ratio shortening will have a smoke point below 350° F. and the ester will form turbid solutions when dissolved in the shortening.

In the upper end of the broad range of hydroxyl numbers given the esters may sometimes form slightly turbid solutions when mixed into the shortening but this turbidity is removable by filtering without damage to the improved properties of the shortening. Above a hydroxyl number of about 240 however the solutions of the ester in shortening are very turbid and frequently cannot be cleared even by repeated filtering, or, if cleared, the solution will be found to have lost its properties as a high ratio shortening.

While it is preferred to form the emulsifier by alcoholysis as described above it will be apparent to those skilled in the art that substantially the same product can be produced by direct esterification.

The high ratio shortening is then made by adding a few percent, say up to 6%, and preferably not more than about 4%, by weight of the esterified product above described to a hydrogenated cottonseed oil shortening. Due to the very high efficiency of this esterified product only a small amount is necessary. In general the amount of emulsifier required is lower than in the case of many of the shortening improvers of the prior art and it is therefore an improvement thereover from an economic standpoint.

The hydrogenated cottonseed oil referred to herein is preferably a partially hydrogenated material of plastic consistency having an iodine number of about 50 to 70 such as the types sold on the market as household shortenings.

The following Examples 1 to 3 illustrate the preparation of the reaction product of mannitol and a hydrogenated cottonseed oil.

EXAMPLE 1

442 grams (about 0.5 mol) of hydrogenated cottonseed oil, were placed in a one-liter, 3 neck ground glass flask equipped with a $CO_2$ inlet tube, a glass agitator apparatus, an outlet tube and a thermometer. To the above fat were added 113.8 grams mannitol (0.625 mol) and 0.5% NaOH based upon the total reactant weight. The reactants were agitated in an inert atmosphere of $CO_2$ and were brought up to a reaction temperature of 428° F. An oil bath was used to heat the reaction flask. After 10 minutes at 428° F. the reaction mixture became uniformly clear in appearance. The reactants were heated one hour longer at 428° F., or for a total of 1 hour 10 minutes at 428° F. The oil bath was removed from the flask and the reactants cooled to 212° F. in the inert atmosphere of $CO_2$. The reactants were then washed for five minutes at 212° F. with 300 grams of a 20% sodium sulfate solution containing 5.5 grams concentrated $H_2SO_4$, a vigorous stream of $CO_2$ being passed into the washing mixture as a means of agitation. The purpose of the washing process is to remove unreacted mannitan from the reaction product. $H_2SO_4$ is used to decompose the sodium soaps formed by the NaOH catalyst. Unwashed esters, even those from which the soap is decomposed and filtered off as inorganic salt, do not form clear solutions in shortenings and further have smoke points less than 300° F. The washing mixture was placed into a separatory funnel. After a few hours the washing layer was removed from the ester layer. The ester was washed a second time for five minutes at 212° F., employing 500 grams of a 20% sodium sulfate solution, while agitating the mixture by passing a vigorous stream of $CO_2$ therethrough. The object of the second wash was to wash out any free $H_2SO_4$ left in the product after the first wash. The washing layer was again removed from the ester layer. The ester layer which contained a small amount of occluded salt and water was deodorized by means of superheated steam for three hours at 320° F. and at a reduced pressure of 5 mm. The ester was cooled in an atmosphere of $CO_2$ to 212° F. and filtered free from its ash.

The above ester had a hydroxyl value of 186. Its smoke point, 3% of ester in a household hydrogenated cottonseed oil shortening, taken in a Cleveland oil testing apparatus, was 363° F.

EXAMPLE 2

442 grams (about 0.5 mol) the same household shortening were reacted with 182 grams (1 mol) mannitol in the presence of 4 grams $Na_2CO_3$ catalyst. The reaction was carried out as before in a 3 neck, 1 liter flask equipped with a $CO_2$ inlet tube, an agitator, an outlet tube and a thermometer. The reactants were heated in an inert atmosphere of $CO_2$ to a reaction temperature of 428° F. An oil bath was used to heat the reaction flask. The reactants became uniformly clear in appearance after being heated for one-half hour at 428° F. The reaction mixture was heated two hours longer at 428° F. The product was then cooled to 212° F. in the inert atmosphere of $CO_2$ and was washed for five minutes at 212° F. with a solution comprising 60 grams anhydrous $Na_2SO_4$ and 6 grams concentrated $H_2SO_4$ in 240 grams water. After the washing layer was separated from the ester layer, the ester was given a second wash with 600 grams of a 20% $Na_2SO_4$ solution for five minutes at 212° F. The ester, after separation from its wash layer, was mixed with a further quantity of the same household shortening equal to about one-quarter the weight of ester, and deodorized with steam for three hours at 320° F. under a reduced pressure of 4 mm. The product was given a further treatment with 1% of an activated carbon for one-half hour at 212° F., was cooled in $CO_2$ to a temperature of 158° F. and filtered.

The smoke point of the above product, 4% in hydrogenated cottonseed oil shortening was 372° F. The hydroxy number of the ester portion of the above product was 198. The product gave sparkling clear solutions when dissolved in shortenings.

EXAMPLE 3

53.5 pounds of hydrogenated cottonseed oil were melted at 122° F. and added to a fifteen-gallon stainless steel kettle. 0.487 pound of anhydrous $Na_2CO_3$ (0.64% of the total charge weight) was added. The charge was agitated by mechanical stirrers and also by passing a violent stream of $CO_2$ through the mixture. 22.3 pounds of mannitol were added at a charge temperature of 122° F. The reactants were heated to 392° F. They formed a uniformly clear product in two hours fifteen minutes after reaching 392° F. The reaction was continued 1.5 hours longer at 392° F. The charge was cooled to 212° F. and 17.0 pounds of the same hydrogenated cottonseed oil (22.4% of the original charge weight) were added. The charge was cooled further to 158° F. and filtered through a filter press with the aid of a little "Super Cel." The product was washed twice, first with a 20% $Na_2SO_4$ solution containing $H_2SO_4$, and secondly with a simple $Na_2SO_4$ solution. The product was deodorized under reduced pressure for three hours at 320° F. with superheated steam. The deodorized product was then given a treatment with 1% of the activated carbon.

The ester portion of the product had a hydroxyl value of 220. Its smoke point, 3% in a household shortening consisting of hydrogenated cottonseed oil, was 362° F. The product when dissolved in a household shortening consisting of hydrogenated cottonseed oil was very slightly turbid in appearance. However, a simple filtration of this solution through filter paper produced a sparkling clear solution.

The products prepared by any of the Examples 1 to 3 or by other means which will now be readily apparent to one skilled in this art can be mixed with a hydrogenated cottonseed oil shortening in the proportion of not more than about 6% and preferably not more than 4% of the product. Such an improved shortening can now be used for baking high ratio cakes and the like as well as for the other conventional uses for shortening. The smoke points of the completed shortenings will be sufficiently high so that no difficulty will be experienced when these products are used for frying and other high temperature cooking operations.

The following examples are intended to illustrate specific formulae for cake baking in which the product of the invention is employed.

EXAMPLE 4

The product of Example 1 was mixed with a household shortening consisting of hydrogenated cottonseed oil to form a mixture containing 3% of said product. The mixing is advantageously carried out by melting the ingredients together, cooling, and then incorporating air by treatment in a homogenizer.

The resulting shortening was employed to make a chocolate cake in accordance with the formula given below which in the baking trade is termed a 160 ratio formula. The cake batter was prepared in separate five minute mixing periods, the ingredients being added as shown.

First mixing period 2 lbs. 8 oz. cake flour
1 lb. 6 oz. of the shortening prepared as described.

These ingredients were admixed preliminarily and then 15 oz. of chocolate liquor were added carefully to the center of the batch to prevent it from sticking to the sides of the mixing bowl.

Second mixing period

To the mixture thus prepared were added:

4 lbs. 1 oz. sugar
1⅞ oz. salt
⅝ oz. baking soda
9 oz. baking powder

Third mixing period

To the mixture thus prepared were added:

2 lbs. 6 oz. whole eggs
2 lbs. 4 oz. whole milk
1 oz. vanilla flavor

In the preparation of the batter the ease of mixing and the absence of curdling were very noticeable. These were attributable to the good mixing qualities of the product of Example 1. The batter exhibited superior properties as contrasted to a comparative batter made up from a hydrogenated cottonseed oil shortening alone. Cakes were baked from the batter thus prepared and had a greater volume and more uniform texture than, and were highly superior to, cakes baked from a comparative batter made up with the hydrogenated cottonseed oil shortening alone.

EXAMPLE 5

The product of Example 1 was mixed with hydrogenated cottonseed oil shortening in such amounts that the said product was present as 3% of the finished mixture. The mixing can be affected advantageously by melting the ingredients together, cooling and homogenizing as described in the preceding example. The resulting shortening was then employed in the preparation of a 140 ratio white cake. The cake batter was prepared in separate mixing periods as in Example 4 in accordance with the following formula.

First mixing period 2 lbs. 8 oz. cake flour
1 lb. 6 oz. of the shortening prepared as described These ingredients were mixed five minutes.

Second mixing period 3 lbs. 8 oz. sugar
1½ oz. salt
2½ oz. baking powder
1 lb. whole milk The ingredients were mixed five minutes.

Third mixing period

To the foregoing mixture were added:

1 lb. 14 oz. egg whites
1 lb. 6 oz. whole milk
¼ oz. vanilla flavor half of which were added and the batter mixed until smooth, the balance then being added and the batter mixed for five minutes. The batter was exceedingly soft, very uniform and there were no signs whatever of curdling.

Cakes baked from this batter were absolutely uniform throughout and had a much better, more uniform texture than cakes baked from the shortening consisting of plain hydrogenated cottonseed oil.

The invention is not to be taken as limited to any particular process for preparing the emulsifier. The preferred emulsifier of the invention is a product substantially the same as that produced by the alcoholysis reaction of from about 1.25 to 2.50 mols of mannitol to 1 mol of hydrogenated cottonseed oil and having a hydroxyl number of from 180 to 240, and preferably from 195 to 220, after removing the catalyst and unreacted ingredients, and deodorization. The invention contemplates such an emulsifier produced either by alcoholysis or by direct esterification.

It will be apparent that the applicability of the shortening product according to the invention is not limited to the specific baking examples given and that these are merely illustrative of the use of the invention.

I claim:
1. An all purpose shortening comprising hydrogenated cottonseed oil and a small but effective amount of a partial ester of mannitan and a fatty acid obtainable by hydrolysis of hydrogenated cottonseed oil, said mannitan ester having a hydroxyl number of from 180 to 240, said shortening having a smoke point not less than about 350° F.

2. An all purpose shortening comprising hydrogenated cottonseed oil and a small but effective amount of a product comprising a partial ester of mannitan and the mixed fatty acids obtainable by hydrolysis of hydrogenated cottonseed oil, said product having a hydroxyl number of from 180 to 240, and said shortening having a smoke point not less than about 350° F.

3. An all purpose shortening comprising hydrogenated cottonseed oil and a small but effective amount of an improver consisting predominantly of mannitan partial esters of fatty acids obtainable by hydrolysis of hydrogenated cottonseed oil, said improver having a hydroxyl number of from 180 to 240 and being produced by reacting from 1.25 to 2.50 mols of mannitol with 1 mol of hydrogenated cottonseed oil, said shortening having a smoke point not less than about 350° F.

4. An all purpose shortening as defined in claim 3 wherein the shortening contains not more than about 6% of said improver.

5. An all purpose shortening as defined in claim 3 wherein the shortening contains not more than about 4% of said improver.

6. An all purpose shortening comprising hydrogenated cottonseed oil, and a small but effective amount of an improver consisting predominantly of mannitan partial esters of fatty acids obtainable by hydrolysis of hydrogenated cottonseed oil, said improver having a hydroxyl number of from 195 to 220 and being produced by reacting from 1.25 to 2.50 mols of mannitol with 1 mol of hydrogenated cottonseed oil, said shortening having a smoke point not less than about 350° F. and being free from turbidity.

7. A shortening as defined in claim 6 wherein the said improver is present in the proportion of not more than about 6% of the shortening.

8. A shortening as defined in claim 6 wherein the said improver is present in the proportion of not more than about 4% of the shortening.

9. A shortening improver miscible with a hydrogenated cottonseed oil shortening to produce a high ratio shortening with a smoke point not less than about 350° F., comprising a mannitan partial ester of fatty acid obtainable by hydrolysis of hydrogenated cottedseed oil, said ester having a hydroxyl value of from 180 to 240.

10. A shortening improver miscible with a hydrogenated cottonseed oil shortening to produce a high ratio shortening with a smoke point not less than about 350° F., said improver consisting predominantly of mannitan partial esters of fatty acids obtainable by hydrolysis of hydrogenated cottonseed oil, said improver having a hydroxyl number of from 180 to 240 and being produced by reacting from 1.25 to 2.50 mols of mannitol with 1 mol of cottonseed oil.

11. A shortening improver as in claim 10 wherein said improver has a hydroxyl value of from 195 to 220.

KENNETH R. BROWN.